Figure 4:
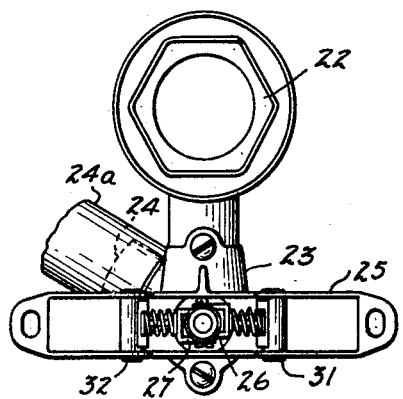

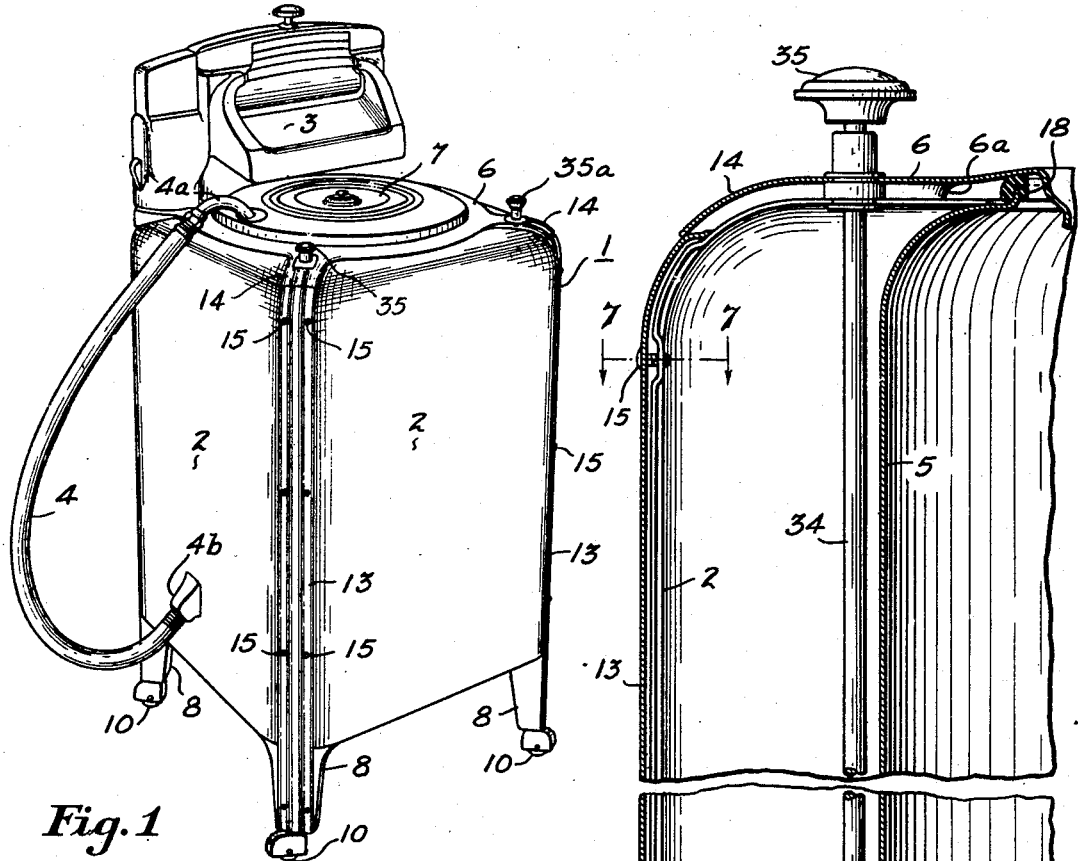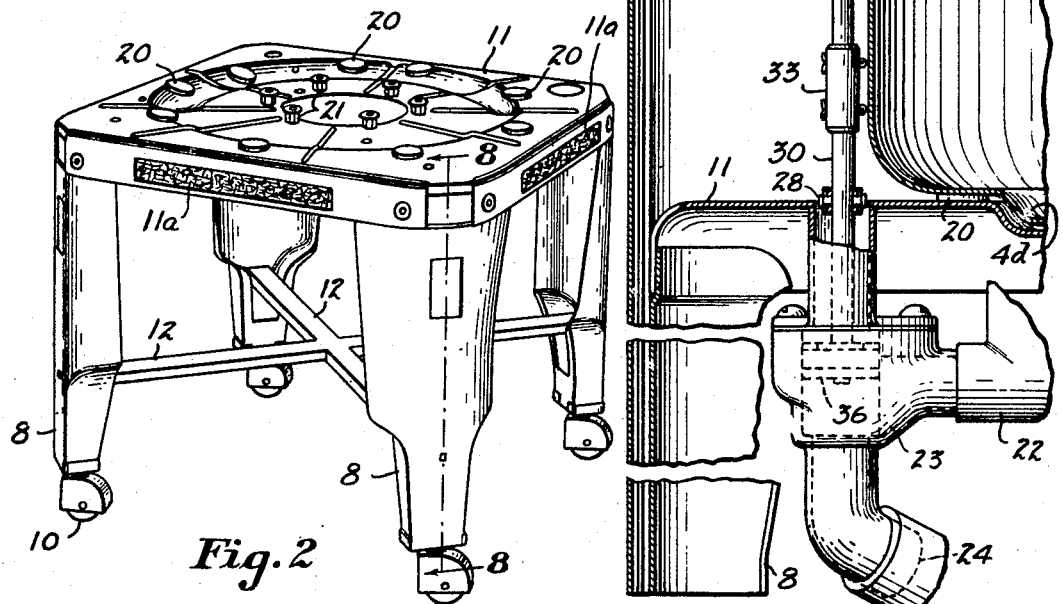
Fig.1  
Fig.2  
Fig.3
INVENTORS
Walter A. Frantz
John J. McCabe
BY
Their ATTORNEY.

Feb. 10, 1942. W. A. FRANTZ ET AL 2,272,517

LAUNDRY MACHINE

Filed July 30, 1936 5 Sheets-Sheet 2

INVENTORS
Walter A. Frantz
John J. McCabe
BY Edmund J. De Pas
Their ATTORNEY.

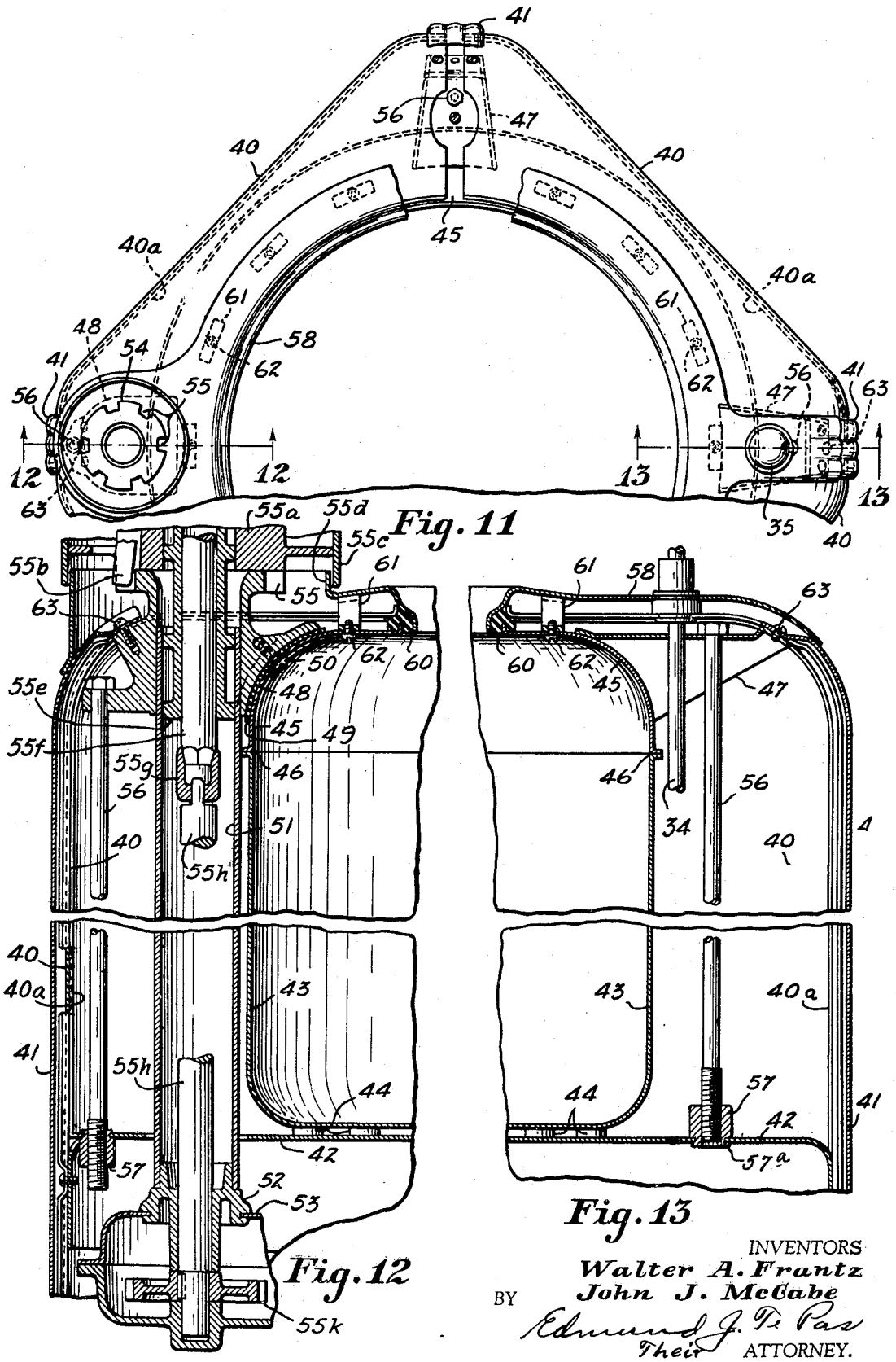

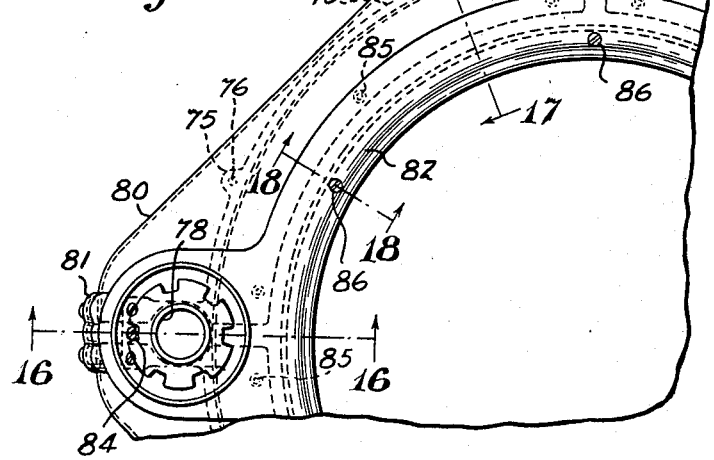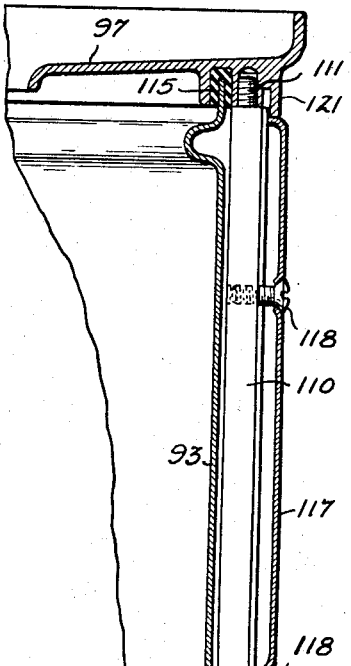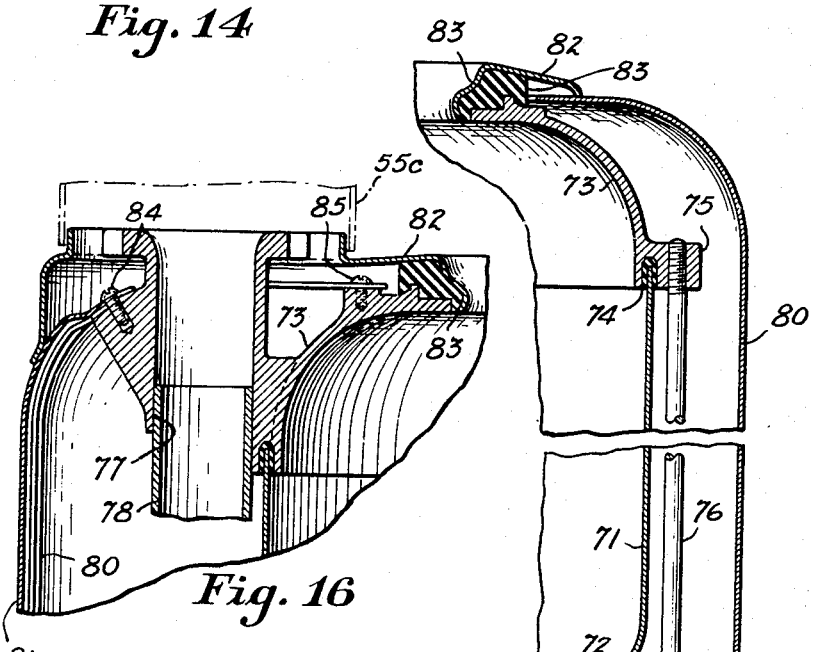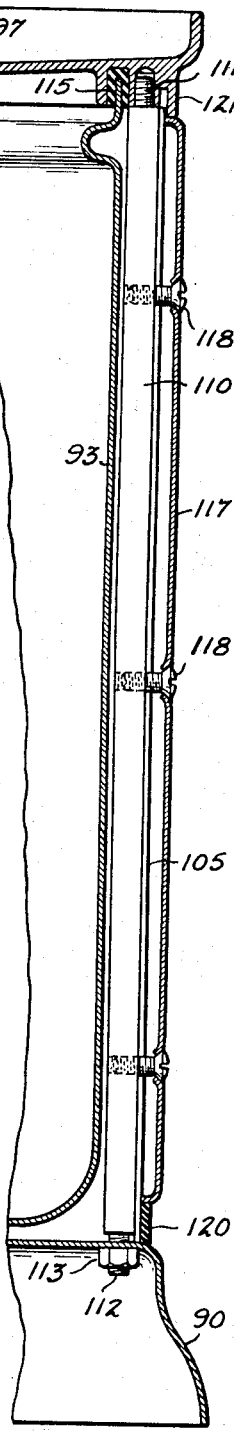

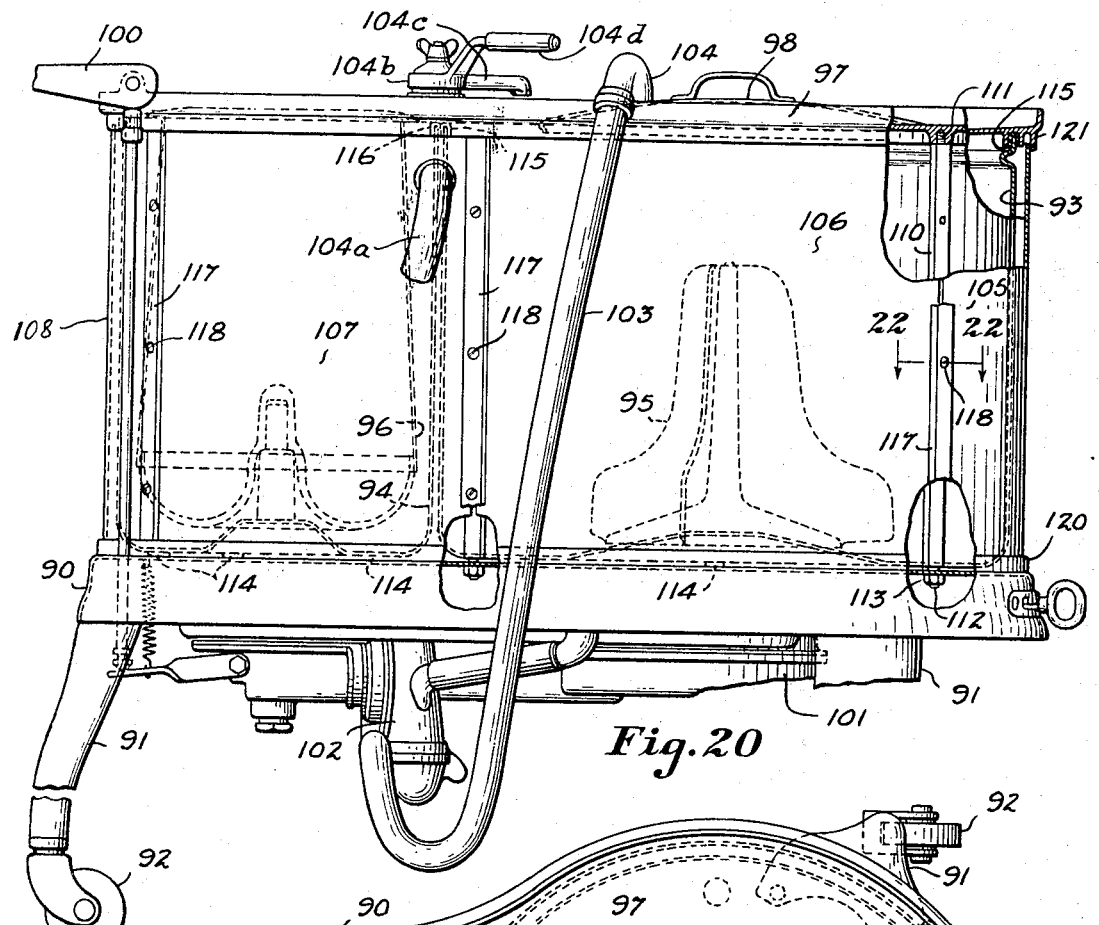
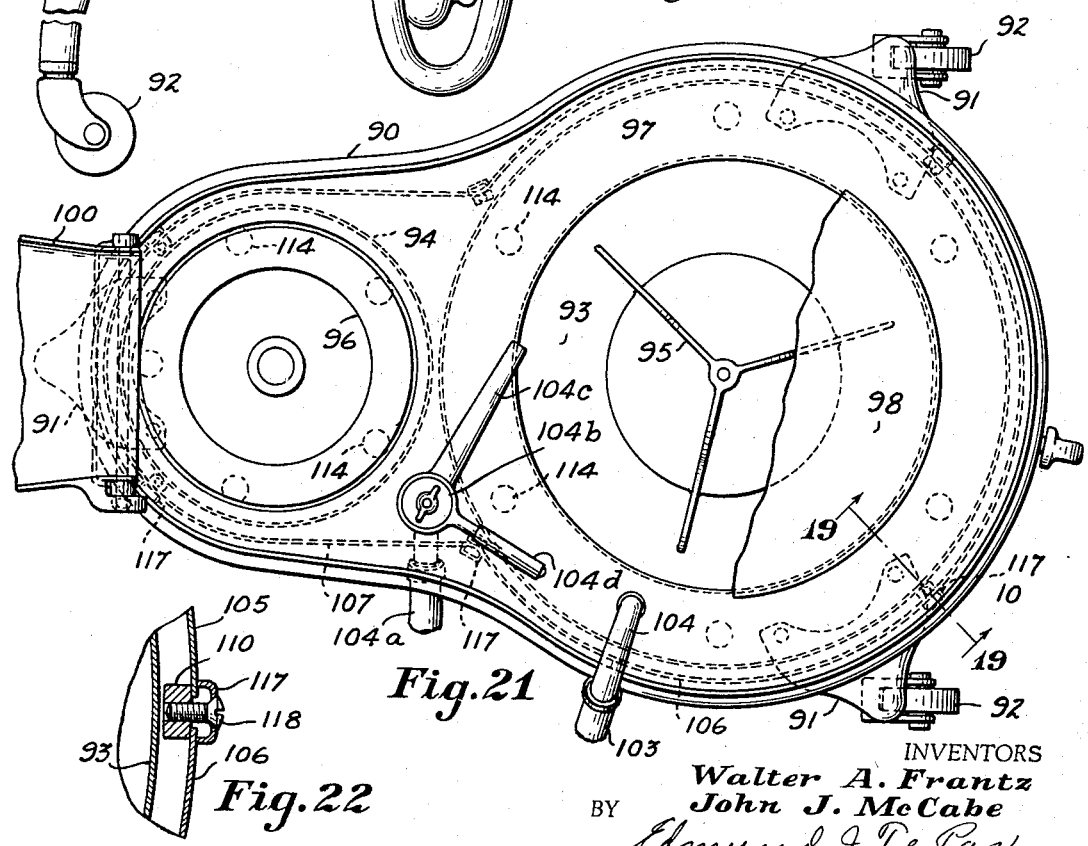

Patented Feb. 10, 1942

2,272,517

UNITED STATES PATENT OFFICE 2,272,517

LAUNDRY MACHINE

Walter A. Frantz, Shaker Heights, and John J. McCabe, Euclid, Ohio, assignors to The Apex Electrical Manufacturing Company, Cleveland, Ohio, a corporation of Ohio Application July 30, 1936, Serial No. 93,450

3 Claims. (Cl. 220—10)

This invention relates to laundry machines and it has for its object the provision of an improved form of casing construction which is designed to enhance the appearance of the machine and which at the same time contributes to its washing efficiency by reducing heat losses from the washer tub.

Another object of the invention relates to the provision of improved control means for the machine, including conveniently located operating knobs at the top of the machine and concealed connections from the knobs to the mechanism which they control.

Another object of the invention relates to the provision of a washing machine having an outer heat insulating and sound deadening casing for the tub and operating mechanism of the machine.

Another object of the invention relates to the provision of a washing machine having an outer easily removable casing which may be replaced for repair or replaced with an interchangeable casing of different design or color to produce a machine of different appearance.

Another object of the invention relates to the provision of a new and novel method of mounting or attaching a porcelain enameled tub in a washing machine to reduce and prevent breakage or chipping of the enamel of the tub.

A further object of the invention relates to the provision of a washing machine, the appearance of which is enhanced by eliminating to a minimum, unsightly exposed crevices, screws and bolts whereby the machine may be kept clean without difficulty.

Another object of the invention relates to the provision of a new and novel method for attaching an upper frame member to a washing machine tub in resilient and leak-proof relation.

A further object of the invention relates to the provision of a washing machine of the type defined, in which the tub of the machine is flexibly secured or resiliently mounted with respect to the portion of the machine with which the tub is in contact.

These and other objects of the invention will become more apparent and better understood after consideration has been given to the following detailed description of the invention taken in connection with the drawings which show, merely by way of illustration, structure adapted for carrying out the objects of the invention.

The present invention constitutes a continuation-in-part of our copending application for Laundry machine, Serial No. 614,001, which was filed in the United States Patent Office on May 27, 1932 and which issued on November 16, 1937, as United States Patent No. 2,099,163. Some of the details of the casing of the machine are shown but not claimed in John J. McCabe application Serial No. 747,390 which issued on September 1, 1936, as United States Patent No. 2,053,158.

Stated in general terms, the invention relates to the provision of a laundry machine casing comprising a relatively strong and rigid frame structure for supporting one or more liquid holding receptacles which preferably are formed from porcelain enameled steel; the arrangement also including resilient members for cushioning the receptacles against shock and for lessening the possibility of harmful mechanical strains being set up in the material of the receptacles which might cause cracking or crazing of the vitreous enamel. The appearance of the machine is enhanced by the provision of an outer casing structure surrounding the liquid holding receptacles. This structure is preferably in the form of detachable panels which also contribute to the efficiency of the machine by reducing heat losses from the liquid containers. The paneling also functions to guard the vitreous enameled surfaces of the tub against damage. The inner surfaces of the panels may be treated to reduce the radiation of heat from the tub and insulating material may be interposed between the panels and the tub and mechanism of the machine to retard heat losses and to quiet the operation of the machine. In addition to the foregoing, the invention comprehends the provision of an improved form of control for the operating mechanism of the machine which includes operating members accessibly located at the top of the machine and having concealed connections with the mechanisms which they control.

Figure 6:
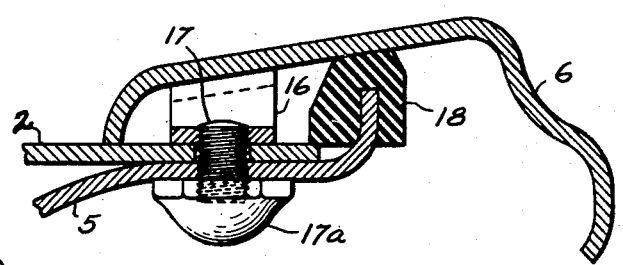
Figure 5:
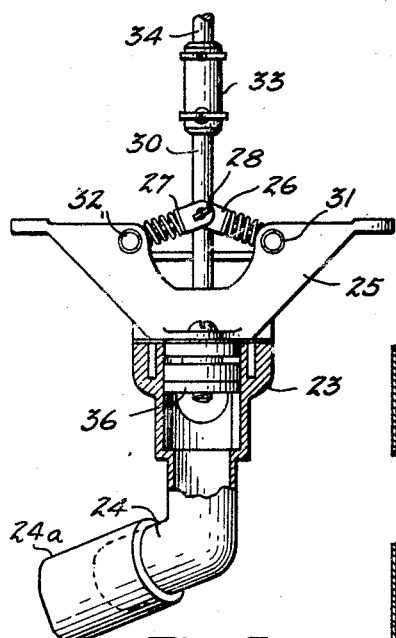
Figure 7:
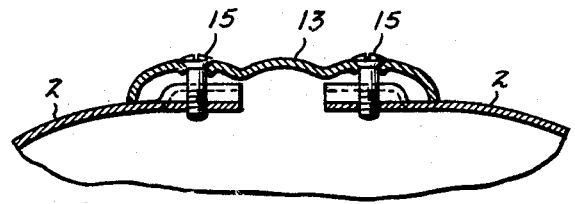
Figures 8, 10:
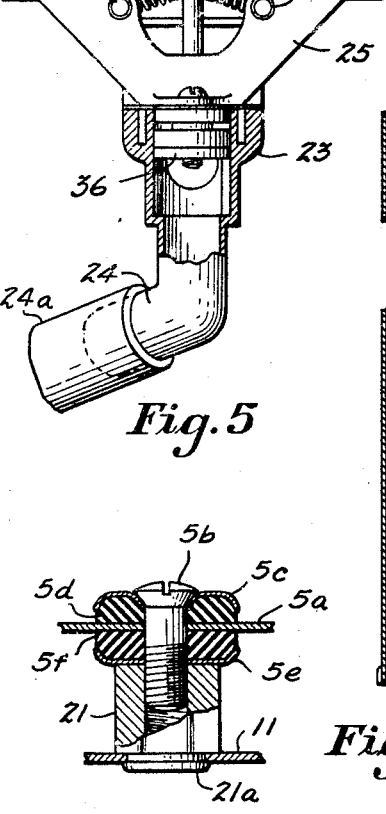
Figure 9:
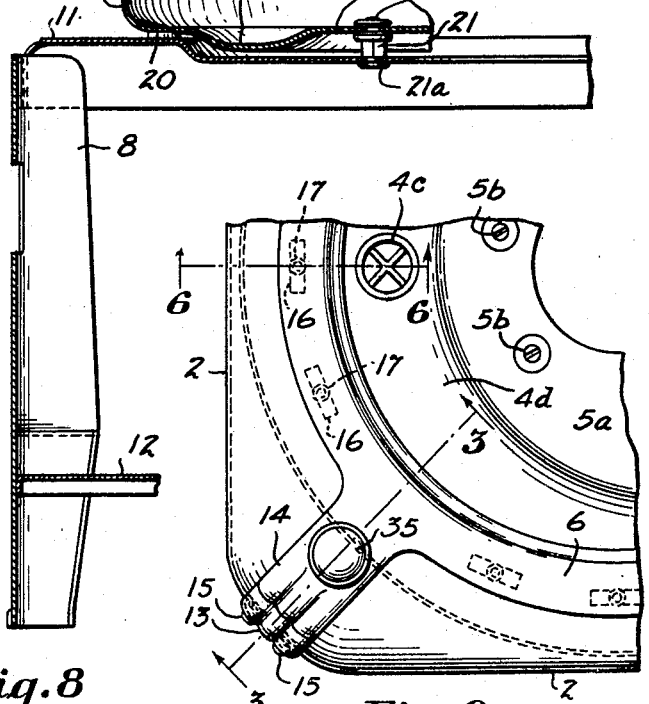

In the drawings, Figure 1 is a perspective view of a washing machine illustrative of one embodiment of the invention; Figure 2 is a perspective view of the supporting base of the washing machine shown in Figure 1; Figure 3 is an enlarged detail sectional view, taken on line 3—3, Figure 9; Figure 4 is a detail plan view of the drain valve of the washer tub; Figure 5 is a side elevational view, partly in section, of the valve shown in Figure 4; Figure 6 is an enlarged detail sectional view of the casing top, taken on line 6—6, Figure 9; Figure 7 is an enlarged detail sectional view, taken on line 7—7, Figure 3; Figure 8 is an enlarged detail sectional view, taken on line 8—8, Figure 2; Figure 9 is a fragmentary plan view of a portion of the top of the casing structure illustrated in Figures 1 and 3; Figure 10 is an enlarged detail sectional view of one of the bolts and nuts by means of which the tub bottom is secured to the supporting base member; Figure 11 is a plan view of the top of a modified form of casing structure; Figures 12 and 13 are enlarged sectional views taken on line 12—12 and line 13—13 respectively of Figure 11; Figure 14 is a fragmentary top plan view of another modification of a laundry machine casing; Figures 15, 16, 17 and 18 are enlarged detail sectional views taken on lines 15—15, 16—16, 17—17 and 18—18 respectively of Figure 14; Figure 19 is an enlarged detail sectional view taken on line 19—19, Figure 21; Figure 20 is a side elevational view of yet another form of laundry machine casing structure; Figure 21 is a plan view of the casing structure illustrated in Figure 20; and Figure 22 is an enlarged detail sectional view taken on line 22—22, Figure 20.

The washing machine illustrated in Figure 1 comprises an outer casing structure 1 formed from a series of similarly formed panels 2, two of which appear in Figure 1. A wringer 3 is supported above the top of the casing and a drain hose 4 is provided for removing water from the tub 5 of the washer. The hose is connected at one end to a fitting 4b and at its free end it is provided with a discharge nozzle 4a.

The tube 5 is completely enclosed by the aforesaid outer casing structure and the outer surface of the tub 5 and the other tubs disclosed herein, may be coated with an aluminum paint or porcelain enameled white to minimize the radiation of heat from the tub. The inner surfaces of the panels of the various machines disclosed herein, likewise may be treated to retard the transfer of heat from the tub by the use of surface finishes which have a low coefficient of heat absorption. The outer casing structure includes in addition to the panels previously mentioned, a top plate 6 defining the working opening of the tub and a seat for a tub cover 7. The cover has a hole for receiving the nozzle 4a of the hose 4.

The machine is carried on supporting legs 8 having floor-contacting rollers 10 at their lower ends. The legs 8 form a part of a supporting base, which includes a top plate 11 secured to the upper ends of the legs and cross braces 12 which engage the intermediate portions of the legs and firmly hold them in place. The panels of the outer casing are engaged near their vertical edges by finishing strips 13, one of which is provided at each corner of the casing. Strips of felt 11a may be attached to the sides of the base or top plate 11 to help support the panels and to partially close off the compartment between the tub and panels of the machine whereby convection heat losses are reduced and at the same time a slight circulation of air is provided for evaporate condensate which may collect on the tub or adjacent surfaces of the panels. The top plate 11 of the supporting base is of substantially imperforate construction except for apertures such as 11b, 11c and 11d which are necessary for the accommodation of certain of the elements of the machine.

The top plate 6 is provided with radially extending portions 14, one of which is in line with each of the finishing strips 13 and which overlie the upper ends of such strips. The finishing strips 13 are secured to the edges of the panels by any suitable means, such as, the screws 15. The top plate 6 is provided at its underside with a plurality of brackets 16 which are each pierced and threaded for receiving threaded studs 17 having nuts 17a, by means of which the top plate, panels and tub are secured to each other. A gasket 18 is fitted over the top rim of the tub in contact with the underside of the top plate 6, so as to prevent escape of liquid at this point from the interior of the tub. The panels 2 are secured with respect to the supporting base by the lowermost pair of screws 15 by means of which the finishing strips 13 are attached to the legs 8 of the base. If desired screws (not shown) concealed beneath the finishing strips 13 may be used to secure the panels 2 directly to the legs 8 of the base.

The tub rests on a series of flexible pads 20 and its bottom 5a is fastened to the supporting base by means of suitable bolts 5b which engage with internally threaded nuts 21 riveted at 21a to the top part 11 of the base of the machine. A dished washer 5c and a soft washer or gasket 5d is interposed between the head of each of the bolts 5b and the tub bottom, and a similarly formed washer 5e and gasket 5f are interposed between each of the nuts 21 and the tub bottom to prevent leakage of fluid from around the bolts 5b. The bottom of the tub is provided with an annular depression or drain trough 4d, the lowermost portion of which communicates with a drain opening 4c.

The washer tub drain opening 4c is connected to the inlet conduit 22 of a drain valve housing 23. The valve housing is also provided with a discharge conduit 24 which is adapted for connection with the drain hose fitting 4b by means of a short section of flexible hose 24a. The valve housing is secured to a bracket 25 which is fastened to the underside of the top plate 11 of the supporting base of the machine.

A pair of similarly formed spring snap-over links 26 and 27 are each pivotally connected at one end to the cross pin 28 of a valve operating rod 30. The other ends of the links 26 and 27 are pivotally secured at 31 and 32 respectively, to the bracket 25. The valve operating rod 30 is provided with a coupling 33 by means of which it is connected to another rod 34 which extends from the coupling to the top of the machine where it is provided with an operating knob 35 so that when the rod is raised, the valve member 36 will open the passageway between the inlet and outlet conduits of the valve casing.

The snap-over mechanism which is formed by the links 26 and 27 insures that the valve will tightly seat when it is moved to its closed position and it also facilitates the operation of this member in either an opening or a closing direction as a very slight pressure is all that is needed to effect the operation of the valve.

A second knob 35a is provided at the top of the casing for controlling the operation of the washing means of the machine. It is preferred to have this control arranged so that when the knob 35a is raised, the washing means is connected to its operating mechanism and when the knob is depressed, the operating mechanism is disconnected from the washing means.

The modified form of casing structure illustrated in Figures 11, 12 and 13 is not greatly different from the casing structure previously described. The latter form of casing includes four similarly formed outer panels 40, the contiguous vertical edges of which are covered by finishing strips 41. The inner surfaces of the panels of this and the other machines disclosed herein may be covered with a felt cloth or paper, such as illustrated at 40a to prevent heat losses and to absorb and prevent the transmission of noise from the operating mechanism of the machine.

The casing structure includes a supporting frame similar to the one shown in Figure 2 and it has a top plate which is indicated by the numeral 42. The frame provides a support for a tub 43, the bottom of which rests upon suitable cushioning pads 44 which are interposed between the tub bottom and the top of the frame. The tub 43 differs from the previously described tub in that it is formed from two pieces instead of being of integral construction, as is the tub first described.

The top part 45 of the tub is formed from a separate stamping which is welded or otherwise secured at 46 in a leak-proof manner to the body of the tub. The top part of the tub is provided with three similarly formed brackets 47 which project outwardly from the tub and which are spaced ninety degrees from each other about the circumference of the tub. These brackets may be welded or secured in any suitable manner to the top part 45 of the tub.

Diametrically opposite to the middle bracket 47, there is provided a cast metal bracket 48 which may be secured to the top part of the tub by means of bolts 50, with a resilient gasket 49 interposed between the surface of the bracket 48 and the surface of the tub to which it is bolted. The bracket 48 has an opening which is adapted to receive the upper end of a wringer column 51, the lower end of which engages with a suitable fitting 52 carried by the top of a gear case 53, within which the operating mechanism of the machine may be housed.

The top part of the bracket 48 is provided with a collar 54 to provide a bearing for a wringer similar to the one shown in Figure 1. This collar is provided with a series of notches 55 by means of which the wringer may be adjusted and secured in different positions about a vertical axis.

A portion of a wringer supporting gear case is indicated at 55a and it carries a locking lever 55b which is adapted to engage with one or the other of the notches 55. The wringer gear case may be provided with a housing 55c, the lower edge of which overlaps the flanged opening 55d which is provided at the top of the machine for the wringer drive and it thus prevents water from finding its way into such opening. The wringer gear case carries a bearing member 55e which is adapted to project into the wringer column 51 and provide a bearing for a wringer drive shaft 55f. A coupling 55g provides a detachable driving connection between the shaft 55f and a shaft 55h. The lower end of this shaft is keyed to a driving gear 55k which is adapted to be operatively connected to driving gearing for the machine housed within the gear case 53.

In the present form of the invention, the tub is secured to its base by means of four tie rods 56, one of which is provided for engagement with each of the brackets 47, 47, 47 and 48. The lower end of the tie rods are adapted for threaded engagement with nuts 57 which are riveted at 57a to the base member 42, so that when the tie rods are tightened, the tub bottom is pressed against its supporting pads 44 and in this manner it is secured to the top 42 of the supporting frame. The top part of the casing has a top plate 58 which is much the same as the top plate 6 previously described.

The inner edge of the top plate 58 is sealed with respect to the top of the tub by means of a gasket 60 and suitable lugs or brackets 61 and screws or bolts 62 are provided to fixedly secure the top plate to the top of the tub. The upper ends of the finishing strips 41 are secured to the brackets 47 and the bracket 48 by means of screws 63. The appearance of the form of casing just described is substantially the same as the casing illustrated in Figure 1 and it differs therefrom principally in the sectional construction of the tub and the manner of its securement to the supporting base or frame.

In the modification of the invention illustrated in Figures 14 to 18, a frame similar to the one shown in Figure 2, having a top plate 70 is provided to support a tub 71, the bottom of which rests upon resilient pads 72 which are interposed between the top of the frame and the tub bottom. In this form of the invention, the tub is provided with vertical side walls, the upper edge of which is engaged in the groove of an annular dome-shaped casting 73. A suitable gasket 74 is interposed between the rim of the tub and the casting to provide a leak-proof joint at this point.

The casting 73 is provided with a plurality of threaded offsets 75 which are each adapted to receive the threaded end of a bolt 76 by means of which the tub is secured to the frame top 70. The casting 73 is provided at one side with an integrally formed sleeve 77 for receiving the upper end of a wringer column 78. The casing of the machine is provided with exterior panels 80, finishing strips 81 and a top plate 82 which are similar in construction to the panels, strips and plates previously described.

A suitable gasket 83 provides a seal between the upper edge of the casting 73 and the inner periphery of the top plate 82, which is much the same as in the case of the other forms of the invention. The upper ends of the finishing strips 81 are secured to the casting 73 by means of screws 84 and additional screws 85 are provided for securing the upper ends of the panels 80 to the casting 73. The panels 40 and 80 may be secured with respect to the base or supporting frame of the machine in the same manner as described for the form of casing shown in Figures 1 to 9. The top plate 82 is secured to the casting 73 by means of a series of bolts or screws 86 having heads which are exposed to view. Other suitable fastening means may be employed such as welding the heads of the screws to the under surface of the top plate, thus adding to the external appearance of the machine by concealing the top plate fastening screws from view.

In the form of the invention illustrated in Figures 19 to 22, the machine is provided with a supporting base 90, which is carried by a plurality of legs 91 having floor-contacting casters or rollers 92. The legs and the base form a supporting structure for a washer tub 93 and an extractor tub 94. A suitable agitator 95 is housed within the washer tub and the rotatable extractor container 96 is carried in the extractor tub. The casing of the machine is provided with a top plate 97 which extends completely over the top of the machine and defines working openings for the washer and extractor tubs, which are provided with covers 98 and 100 respectively.

Suitable mechanism, indicated generally by the numeral 101, is supported beneath the base member 90 for operating the agitator and extractor and a pump 102 is provided for the removal of liquid from the washer and extractor tubs. This pump is connected to a suitable drain hose 103 which may be provided with a gooseneck discharge nozzle 104 at its upper end.

Water may be supplied to the machine by way of a supply hose 104a, one end of which is connected to a valve 104b. This valve is provided with an operating member (not shown) communicating with a discharge nozzle 104c which may be directed to discharge into one or the other of the tubs of the machine by means of the operating handle 104d.

The washer and extractor tubs 93 and 94 are completely surrounded at their sides by a number of panels, 105, 106, 107 and 108 of which appear in Figure 20. The panels 105 and 108 extend around the ends of the casing to the opposite side of the machine, where panels similar to the panels 106 and 107 are provided.

The washer and extractor tubs are gripped between the top plate 97 and the base 90 by means of a series of similarly formed tie rods 110, which have threaded upper ends 111 which are received in threaded bosses formed at the underside of the top plate. The base 90 is pierced for receiving the lower threaded end 112 of the tie rods and nuts 113 are provided for securing the tie rods in place and for tightly clamping the washer and extractor tubs between the top plate 97 and the base 90.

Suitable flexible pads 114 are placed beneath the washer and extractor tubs. Soft resilient gaskets 115 and 116 are interposed between the washer and extractor tubs respectively and the top plate 97 at the place where it engages these tubs. The panels of the machine are held in place by means of finishing strips 117 which are secured to the tie rods by any suitable means, such as, screws 118 and in this manner the vertical edges of the panels are fixedly secured with respect to the tie rods or vertical columns 110. A soft rubber gasket 120 is fitted about the lower edges of the panels. The upper edges of the panels are embraced by or extend to a downwardly extending flange 121 which is formed at the underside of the top plate 97.

In some of the forms of the invention, the exterior casing is rectangular in shape, which permits the gear case and the wringer driving and supporting mechanism to be completely enclosed within the outer casing, thereby concealing from view parts which detract from the appearance of the machine. However, it is to be understood that the improvements herein described, can easily be incorporated into a casing of a different external shape i. e. round or partly round without departing from the spirit and scope of the invention.

The foregoing description and the accompanying drawings to which it relates, describes what might be termed the preferred modes of practicing the invention. It is to be clearly understood, however, that the invention includes each and every novel feature or combination of novel features herein disclosed, subject only to the restrictions of the prior art, and that the invention may assume other forms and it is not to be limited to the particular and specific structure shown and described herein.

Having thus described our invention what we claim is:

1. A washing machine casing structure comprising, a supporting base, a tub secured to said base, panels surrounding said tub in spaced relation with respect to the tub and having inturned portions overlying the top of the tub, a top plate secured to and overlying the upper ends of said panels, and means for securing said panels to said supporting base and tub.

2. A washing machine casing structure comprising, a supporting base, a tub secured to said base, panels surrounding said tub in spaced relation with respect to the tub and having inturned portions overlying the top of the tub, a top plate secured to and overlying the upper ends of said panels, and finishing strips and associated fastening devices for securing the panels to each other and to the base of the machine.

3. A washing machine casing structure comprising, a supporting base, a tub secured to said base, panels surrounding said tub and base in spaced relation with respect to the tub sidewalls, a top plate secured to and overlying the upper ends of said panels, finishing strips overlying the contiguous edges of said panels, and associated fastening devices for securing the panels to each other and to the base of the machine, said top plate being provided with radially extending arms which overlie the upper ends of said finishing strips.

WALTER A. FRANTZ.
JOHN J. McCABE.